(12) United States Patent
Hayashi et al.

(10) Patent No.: US 10,480,670 B2
(45) Date of Patent: Nov. 19, 2019

(54) VALVE ELEMENT AND FLUID CONTROL VALVE

(71) Applicant: HORIBA STEC, Co., Ltd., Kyoto-shi, Kyoto (JP)

(72) Inventors: Shigeyuki Hayashi, Kyoto (JP); Kazuya Shakudo, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 15/481,294

(22) Filed: Apr. 6, 2017

(65) Prior Publication Data

US 2017/0292622 A1 Oct. 12, 2017

(30) Foreign Application Priority Data

Apr. 7, 2016 (JP) .................. 2016-077659

(51) Int. Cl.
| | |
|---|---|
| *F16K 1/36* | (2006.01) |
| *F16K 1/44* | (2006.01) |
| *F16K 25/00* | (2006.01) |
| *F16K 27/02* | (2006.01) |
| *F16K 31/00* | (2006.01) |
| *G05D 7/06* | (2006.01) |

(52) U.S. Cl.
CPC ............. *F16K 27/02* (2013.01); *F16K 1/36* (2013.01); *F16K 1/44* (2013.01); *F16K 25/005* (2013.01); *F16K 31/007* (2013.01); *G05D 7/0629* (2013.01); *G05D 7/0635* (2013.01)

(58) Field of Classification Search
CPC ..... F16K 1/36; F16K 1/44; F16K 3/36; F16K 5/22; F16K 5/222; F16K 5/225; F16K 5/227; F16K 25/005; F16K 25/04; F16K 1/46; F16K 3/0236; F16K 3/0227
See application file for complete search history.

(56) References Cited

U.S. PATENT DOCUMENTS 5,075,378 A * 12/1991 Smierciak ............. C08G 59/40
525/109
2008/0213601 A1* 9/2008 Yamamoto ............. B05D 5/086
428/446

(Continued)

FOREIGN PATENT DOCUMENTS

| CN | 103671939 A | 3/2014 |
|---|---|---|
| CN | 103862619 A | 6/2014 |

(Continued)

OTHER PUBLICATIONS

China National Intellectual Property Administration, Office Action and Search Report Issued in Application No. 201710229874.8, dated Jul. 25, 2019, 10 pages.

*Primary Examiner* — Reinaldo Sanchez-Medina
*Assistant Examiner* — Hailey K. Do
(74) *Attorney, Agent, or Firm* — Alleman Hall Creasman & Tuttle LLP

(57) ABSTRACT

In order to provide a fluid control valve less likely to cause contamination, and a fluid control apparatus using the fluid control valve, at least any one of a valve seat member and a valve body member is one including a base body made of metal; and a resin layer that covers the surface of the base body to form a valve seat surface or a seating surface, in which the resin layer is directly chemically bonded to the base body.

9 Claims, 13 Drawing Sheets

(56) References Cited

U.S. PATENT DOCUMENTS

2014/0070128 A1* 3/2014 Hayashi ............... F16K 25/005
  251/359
2016/0107376 A1 4/2016 Nakajima et al.

FOREIGN PATENT DOCUMENTS

| CN | 105034473 A | 11/2015 |
| CN | 105339166 A | 2/2016 |
| JP | 2014052036 A | 3/2014 |

* cited by examiner

VALVE ELEMENT AND FLUID CONTROL VALVE

TECHNICAL FIELD

The present invention relates to a fluid control valve adapted to control the flow of a gas used in, for example, a semiconductor process or the like, and to a fluid control apparatus, for example a flow rate controller or a pressure controller, having the fluid control valve.

BACKGROUND ART

As disclosed in Patent Literature 1, a fluid control valve of this type of flow rate controller is usually conceived so as to improve sealing performance and lessen the effect of particles by coating the surface of a metallic base body with an elastic resin layer to form a seating surface. In addition, the resin layer is usually stuck on the metallic base body via a layer of an adhesive such as a primer.

CITATION LIST

Patent Literature

Patent Literature 1: JP-A 2014-052036

SUMMARY OF INVENTION

Technical Problem

However, when such a flow rate controller is used in, for example, a semiconductor process or the like, and creep damage or the like occurs to the resin layer, the underlying adhesive layer is exposed and flows out as contaminations, and as a result, semiconductor manufacturing may be adversely affected.

Therefore, the main intended object of the present invention is to provide a fluid control valve less likely to cause contamination, and a fluid control apparatus using the fluid control valve.

SOLUTION TO PROBLEM

That is, the fluid control valve according to the present invention is a fluid control valve including a valve seat member formed with a valve seat surface; and a valve body member formed with a seating surface seated on the valve seat surface, and controlling the flow of fluid by separating or contacting the valve seat surface and the seating surface from or with each other. In addition, at least any one of the valve seat member and the valve body member includes a base body made of metal; and a resin layer that covers the surface of the base body to form a part or the whole of the valve seat surface or the seating surface, and the resin layer is directly chemically bonded to the base body.

In such a configuration, since the resin layer itself is chemically bonded to the metallic base body, and any layer of an adhesive such as a primer is not interposed, the occurrence of contamination due to the outflow of an adhesive layer can be essentially eliminated.

As a raw material of the resin layer, a particularly preferable one is a crosslinked modified fluorine-based resin.

A fluorine-based resin is essentially superior in heat resistance and corrosion resistance, and also additionally has advantages such as non-adhesiveness and low friction, and is therefore preferably used when the fluid control valve of the present invention is used in the field of semiconductor manufacturing where corrosive gases are used under high temperatures.

However, since the fluorine-based resin is poor in adhesiveness, a primer is required as an underlying layer, and this may cause the above-described contamination.

On the other hand, the crosslinked modified fluorine-based resin is crosslinked by some means such as irradiating the fluorine-based resin with radiation under specific conditions, and at the time of the crosslinking, can be chemically bonded to metal to directly adhere to the metallic base body, and therefore the need for a primer that possibly causes contamination can be eliminated. Note that the term "crosslink" herein refers to the crosslink between resins, but does not mean the crosslink between metal and resin.

Further, the crosslinked modified fluorine-based resin has improved abrasiveness as compared to before the modification, and significantly reduces the degree of creep, and therefore the effect of being able to suppress the deformation of and/or damage to the valve seat surface or the seating surface to extend the life thereof can be obtained. In addition, as compared with before the modification, elasticity is also improved, and therefore the valve seat surface can be separated from or contacted with the seating surface without adhering to the valve seat surface. As a result, the effect of improving the responsiveness of the fluid control valve can also be expected.

Specifically, as the crosslinked modified fluorine-based resin, one obtained by crosslinking and modifying a copolymer obtained by using one or by mixing two or more selected from a tetrafluoroethylene copolymer, a tetrafluoroethylene-perfluoro (alkyl vinyl ether) copolymer, a tetrafluoroethylene-hexafluoropropylene copolymer, a tetrafluoroethylene-ethylene copolymer, or a polychlorotrifluoroethylene copolymer can be cited.

Embodiments capable of further enhancing the effect of the present invention can include one in which the valve seat member or the valve body member is driven by a driving mechanism utilizing extension and contraction motions of a piezoelectric element, and the valve seat surface and the seating surface are thereby separated from or contacted with each other.

This type of piezo-driven fluid control valve is one such that an on-off stroke is basically small, and the sealing performance is significantly deteriorated by slight damage to and/or slight deformation of the valve seat surface or the seating surface to significantly change flow rate control characteristics, and therefore the effect of being able to suppress the damage to or deformation of the valve seat surface or the seating surface can be further enhanced.

Also, when using the crosslinked modified fluorine-based resin for the resin layer, the effect of improving the elasticity of the valve seat surface or the seating surface to enhance the responsiveness of the valve is expected as described above. In addition to this, the piezo-driven fluid control valve is essentially characterized by high responsiveness, and therefore the characteristic can be further utilized.

In order to make it possible to control a large flow rate with small strokes, there is known a fluid control valve in which the surface of a base body is formed with a groove or a hole through which fluid circulates, and in such a fluid control valve, it is preferable that a resin layer is formed so as to not be formed inside the groove or the hole.

Advantageous Effects of Invention

According to the present invention configured as described above, in addition to obtaining the effect of being able to suppress the deformation of and/or damage to the valve seat surface or the seating surface to provide stable performance over a long period of time, the problem of contamination due to a primer or the like does not occur. Further, the effect of improving responsiveness can also be expected.

DESCRIPTION OF EMBODIMENTS

In the following, an embodiment of the present invention will be described with reference to the drawings.

In this embodiment, a flow rate controller 100 will be described as an example of a fluid controller.

Figure 1:
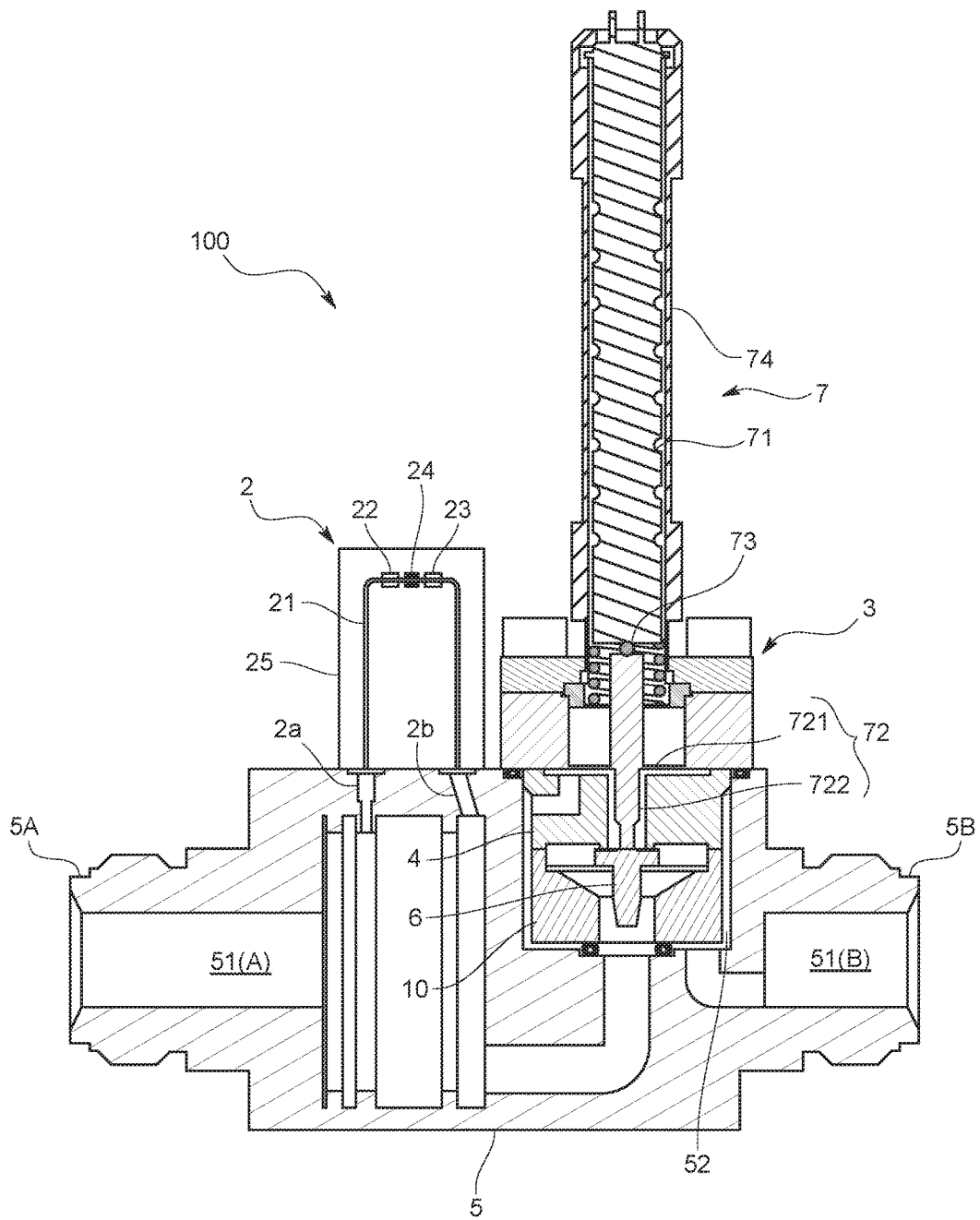
FIG. 1 is an overall vertical cross-sectional view of a flow rate controller in an embodiment of the present invention.

The flow rate controller 100 is one used for a semiconductor manufacturing apparatus, and as illustrated in FIG. 1, includes a body 5 formed with a flow path 51 (e.g., 51(A) and 51(B)) through which fluid such as gas used in a semiconductor process flows, a flow rate sensing mechanism 2 adapted to sense the flow rate of the fluid flowing through the flow path 51 of the body 5, a fluid control valve 3 adapted to control the flow rate of the fluid flowing through the flow path 51, and a control part (not illustrated) adapted to control the valve opening level of the fluid control valve 3 in order to bring the measured flow rate outputted by the flow rate sensing mechanism 2 close to a predetermined setting flow rate. The respective parts will be specifically described below.

The body 5 is one forming a block shape through which the above-described flow path 51 penetrates, and the upstream end of the flow path 51 is connected to an external inflow pipe (not illustrated) as an upstream side port 5A, whereas the downstream end is connected to an external outflow pipe (not illustrated) as a downstream side port 5B.

As the flow rate sensing mechanism 2, various types such as a thermal type, a differential pressure type, a Coriolis type, and an ultrasonic type are conceivable, and herein a so-called thermal type flow rate sensing mechanism is employed. The thermal type flow rate sensing mechanism 2 is one including a narrow tube 21 that is connected in parallel to the flow path 51 so as to divert a predetermined portion of the fluid flowing through the flow path 51, a heater 24 provided around the narrow tube 21, and a pair of temperature sensors 22 and 23 provided before and after the heater 24. In addition, when the fluid flows through the narrow tube 21, a temperature difference corresponding to the mass flow rate of the fluid occurs between the two temperature sensors 22 and 23, and therefore the flow rate sensing mechanism 2 is configured to measure the flow rate on the basis of the temperature difference.

This embodiment is configured to provide a long-shaped casing 25 containing the narrow tube 21, heater 24, temperature sensors 22 and 23, and an electric circuit peripheral to them. In addition, this embodiment is also configured such that by branching the flow path 51 of the body 5 into a pair of branched flow paths 2a and 2b and attaching the casing 25 to the body 5, an introduction port of the narrow tube 21 is connected to the branched flow path 2a on the upstream side and a lead-out port of the narrow tube 21 is connected to the branched flow path 2b on the downstream side. Note that a flow rate sensor is not limited to this type.

The fluid control valve 3 is one that is provided in the flow path 51 and of a normally-closed type, and includes a valve seat member 4 and a valve body member 6 that are contained in the body 5; and an actuator 7 as a driving mechanism that drives the valve body member 6 to set the valve opening level, i.e., to set the separation distance between the valve seat member 4 and the valve body member 6.

Figure 2:
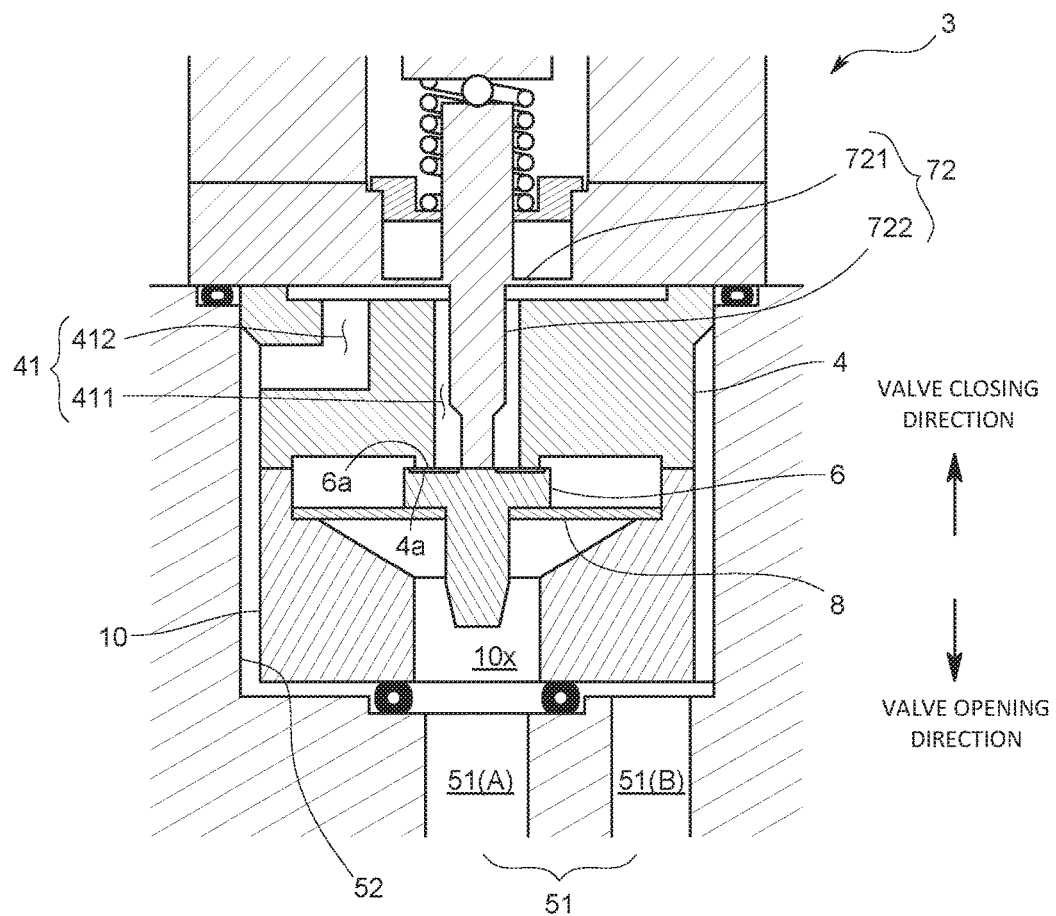
FIG. 2 is a vertical cross-sectional view of a fluid control valve in the same embodiment.

As illustrated in FIG. 2, the valve seat member 4 is a metallic one (herein, stainless steel is used as a raw material, however, an alloy having high heat resistance and corrosion resistance such as Hastelloy may be used) that on the lower surface thereof, has a valve seat surface 4a protruding toward the valve body member 6 and forms a substantially rotating body shape, inside which an internal flow path 41 is formed. In addition, as a raw material of the valve seat member 4, an alloy having high heat resistance and corrosion resistance such as Hastelloy may be used.

The internal flow path 41 includes a first internal flow path 411 of which one end is opened in the valve seat surface 4a and the other end is opened on the upper surface of the valve seat member 4, and a second internal flow path 412 of which one end is opened in the upper surface of the valve seat member 4 and the other end is opened in the side circumferential surface of the valve seat member 4. Also, the first internal flow path 411 is inserted with the below-described drive shaft (abutting shaft member 722) of the actuator 7.

In addition, the one end opening of the first internal flow path 411 is opened in the central part of the valve seat surface 4a, causing the valve seat surface 4a to be one forming a substantially annular shape in a plan view. Further, the first internal flow path 411 and the second internal flow path 412 are communicatively connected to each other via a space formed by a concave part formed on the upper surface of the valve seat member 4 and a diaphragm member 721 adapted to block the concave part. Note that the internal flow path 41 is not limited to one configured to include the first internal flow path 411 and the second internal flow path 412, but may be configured to communicatively connect thereto inside the valve seat member 4.

The valve seat member 4 is contained in a columnar-shaped containing concave part 52 provided in the body 5. The containing concave part 52 is arranged so as to divide the flow path 51 of the body 5. In addition, the flow path 51 divided by the containing concave part 52 is configured such that a flow path on the upstream side (hereinafter also referred to as an upstream side flow path) 51(A) is opened, for example, in the central part of the bottom surface of the containing concave part 52, and a flow path on the downstream side of the containing concave part 52 (hereinafter also referred to as a downstream side flow path) 52(B) is opened, for example, in the circumferential edge part of the bottom surface of the containing concave part 52 or in the side surface of the containing concave part 52.

Further, in a state where the valve seat member 4 is contained in the containing concave part 52, a gap is formed between the outer circumferential surface of the valve seat member 4 and the inner circumferential surface of the containing concave part 52, and thereby the downstream side flow path 51(B) of the body 5 is communicatively connected to the internal flow path 41 via the side circumferential surface of the containing concave part 52.

The valve body member 6 is arranged opposite to the valve seat member 4 in the containing concave part 52 of the body 5. In addition, the valve body member 6 is arranged at a predetermined interval from the inner circumferential surface of the containing concave part 52 without contacting with the inner circumferential surface, and forms a substantially rotating body shape having a seating surface 6a on the upper surface thereof.

The valve body member 6 is driven by the actuator 7, and transitions from a close state of contacting with the valve seat member 4 to block the upstream side flow path 51(A) and the downstream side flow path 51(B) from each other to an open state of separating from the valve seat member 4 to communicatively connect the upstream side flow path 51(A) and the downstream side flow path 51(B) to each other. A direction from the close state toward the open state as described above, i.e., a direction in which the driving force of the actuator 7 acts on the valve body member 6 is hereinafter referred to as a valve opening direction. On the other hand, a direction from the open state toward the close state, i.e., a direction opposite to the direction in which the driving force of the actuator 7 acts on the valve body member 6 is hereinafter referred to as a valve closing direction.

The actuator 7 is, for example, one including a piezo stack 71 formed by stacking multiple piezoelectric elements and a working body 72 that is displaced by extension of the piezo stack 71.

The piezo stack 71 is contained in a casing member 74, and the fore end part of the piezo stack 71 is connected to the working body 72 via an intermediate connecting member 73. The working body 72 in the present embodiment has the diaphragm member 721, and the abutting shaft part 722 that penetrates through the center of the valve seat member 4 (the first internal flow path 411) and abuts on the upper surface of the valve body member 6. Further, when a predetermined full open voltage is applied, the piezo stack 71 extends to allow the working body 72 to bias the valve body member 6 in the valve opening direction, and thereby the valve seat surface 4a is separated from the seating surface 6a to enter the open state. Also, a voltage falling below the full opening voltage allows the valve seat surface 4a and the seating surface 6a to be separated from each other by a distance corresponding to the value of the voltage. As a result, through the resulting gap, the upstream side flow path 51(A) and the downstream side flow path 51(B) are communicatively connected to each other.

In addition, a valve body return spring 8 adapted to bias the valve body member 6 in the valve closing direction is provided for the valve body member 6 in contact with the valve body member 6. The valve body return spring 8 allows the valve body member 6 to enter the close state in a normal condition where no voltage is applied to the actuator 7.

The valve body return spring 8 is a leaf spring supported by a spring guide member 10 contained in the containing concave part 52 of the body 5, and as illustrated in FIG. 2, provided in contact with the downward surface of the valve body member 6. Note that as the valve body return spring 8, an elastic body other than a leaf spring may be used as long as the elastic body biases the valve body member 6. The elastic body may directly or indirectly bias the valve body member 6.

The spring guide member 10 is one that is for supporting the spring 8 in the containing concave part 52 and forms a substantially rotating body shape having a cross-sectionally concave shape. In addition, the bottom wall of the spring guide member 10 is formed with an opening part 10x that is opened in the bottom surface of the containing concave part 52 and communicatively connects to the upstream side flow path 51(A), and the upper end part of the side circumferential wall of the spring guide member 10 contacts with the circumferential edge part of the valve seat member 4. Further, on the inner circumferential surface of the spring guide member 10, the valve body return spring 8 is provided. As described above, the present embodiment is configured to contain the valve body member 6 in a space formed by the valve seat member 4 and the spring guide member 10. Also, the valve body member 6 is arranged at a predetermined interval from the inner circumferential surface of the spring guide member 10, and the outer circumferential surface of the valve body member 6 is separated from the inner circumferential surface of the spring guide member 10 facing to the outer circumferential surface.

Figure 3:
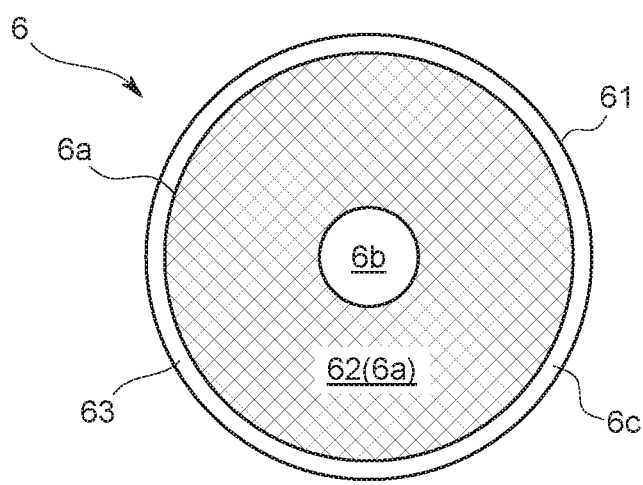
FIG. 3 is a plan view of a valve body member in the same embodiment.
Figure 4:
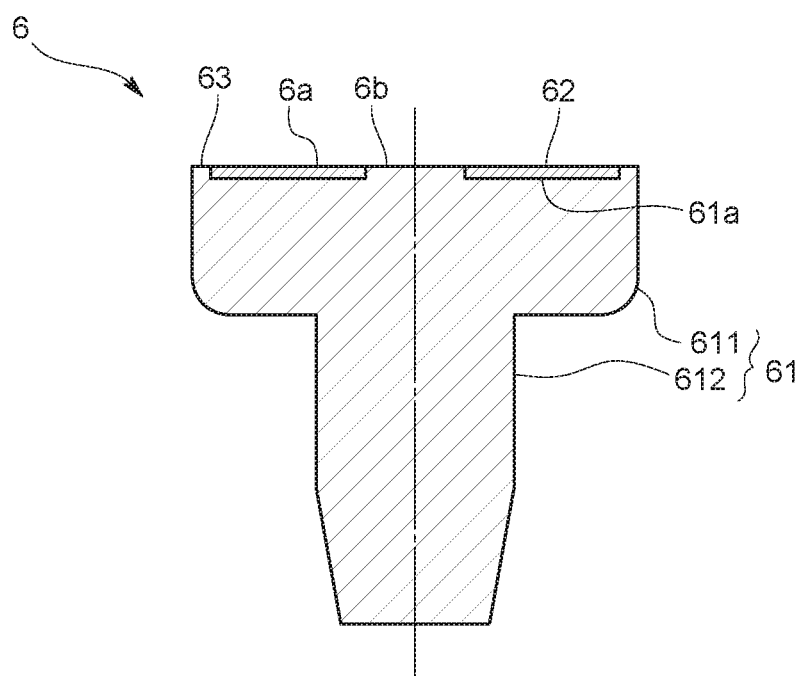
FIG. 4 is a vertical cross-sectional view of the valve body member in the same embodiment.

Further, as illustrated in FIGS. 3 and 4, the valve body member 6 in the present embodiment is one including a base body 61 made of metal (herein, stainless steel is used as a raw material, but besides, an alloy having high heat resistance and corrosion resistance such as Hastelloy may be used), and a resin layer 62 covering part of one end surface of the base body 61.

The base body 61 is, for example, one including a disc part 611, and a small diameter columnar part 612 coaxially and integrally extending from the disc part 611. In addition, on the one end surface of the disc part 611 on the side opposite to the columnar part 612, a concave part 61a that is of a wide, annular, and bottomed groove shape is formed.

The concave part 61a is formed so as to surround a driving force acting surface 6b on which the abutting shaft part 722 of the actuator 7 contacts and the driving force acts, and forms a substantially annular shape in a plan view and a substantially upward U-shape in a cross-sectional view. The depth of the concave part 61a is, for example, 50 to 150 μm. The driving force acting surface 6b is formed in the central part of the upper surface of the valve body member 6, and is also formed to be slightly larger than a contact area with the abutting shaft part 722. In this manner, the driving force acting surface 6b and the concave part 61a are concentrically formed on the upper surface.

The resin layer 62 is one provided so as to be fitted into the concave part 61a, and the surface thereof acts as the seating surface 6a. In addition, the thickness of the resin layer 62 is set such that the seating surface 6a is flush with the surrounding surface of the concave part 61a, i.e., with the driving force acting surface 6b and the surfaces 6c of an outer protruded rim part 63.

Further, in this embodiment, for the resin layer 62, crosslinked modified fluorine-based resin (herein, modified PFA) is used, and the resin layer 62 is directly stuck to the base body 61.

The crosslinked modified fluorine-based resin is one crosslinked by, for example, irradiating fluorine-based resin with ionizing radiation under specific conditions, and as compared with before the modification, has improved abrasiveness and significantly reduce the degree of creep.

Thus, in the fluid control valve 3 configured as described above, the seating surface 6a is formed of the crosslinked modified fluorine-based resin, and therefore the deformation of and/or damage to the seating surface 6a can be suppressed to keep the sealing performance and action smoothness over a long period of time. As a result, stable and highly accurate flow rate control can be performed over a long period of time.

Figure 5:
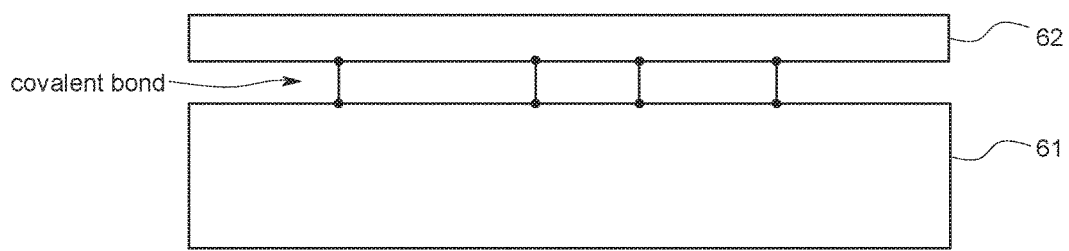
FIG. 5 is a schematic view of a bonding portion between a resin layer and a base body in the same embodiment.
Figure 6:
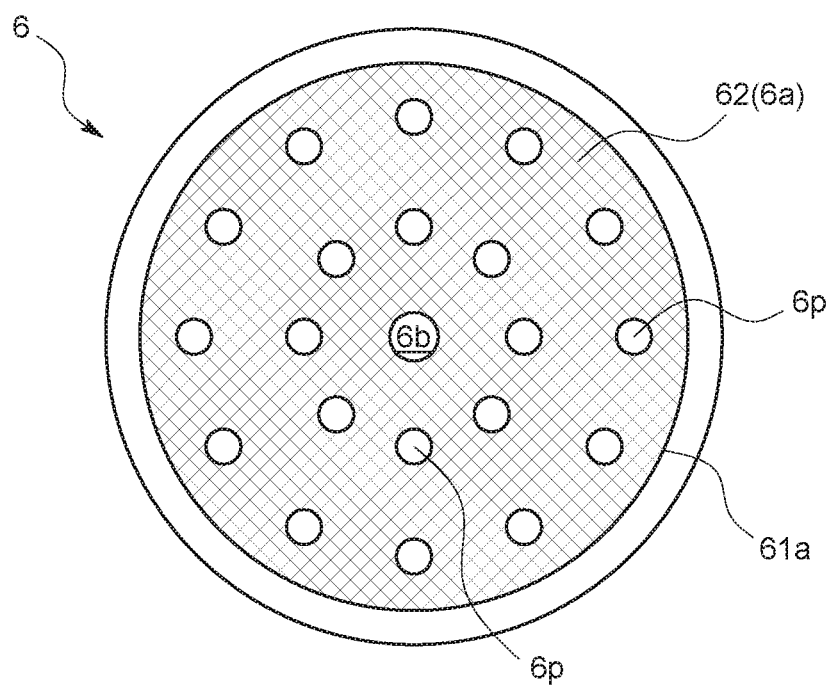
FIG. 6 is a plan view of a valve body member in a variation of the present embodiment.
Figure 7:
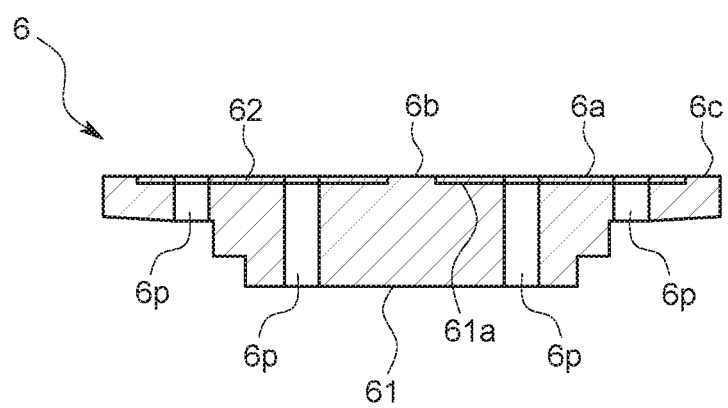
FIG. 7 is a vertical cross-sectional view of the valve body member in the variation of the present embodiment.
Figure 8:
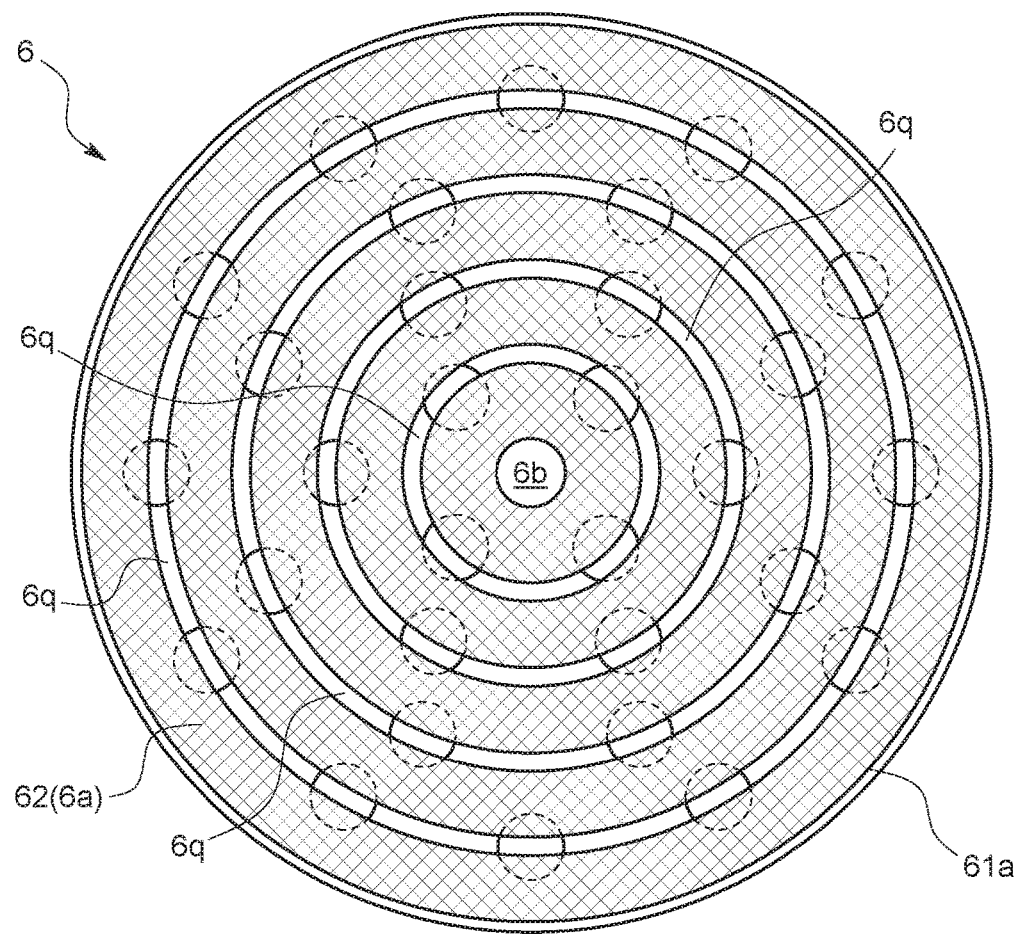
FIG. 8 is a plan view of a valve body member in an alternative variation of the present invention.
Figure 9:
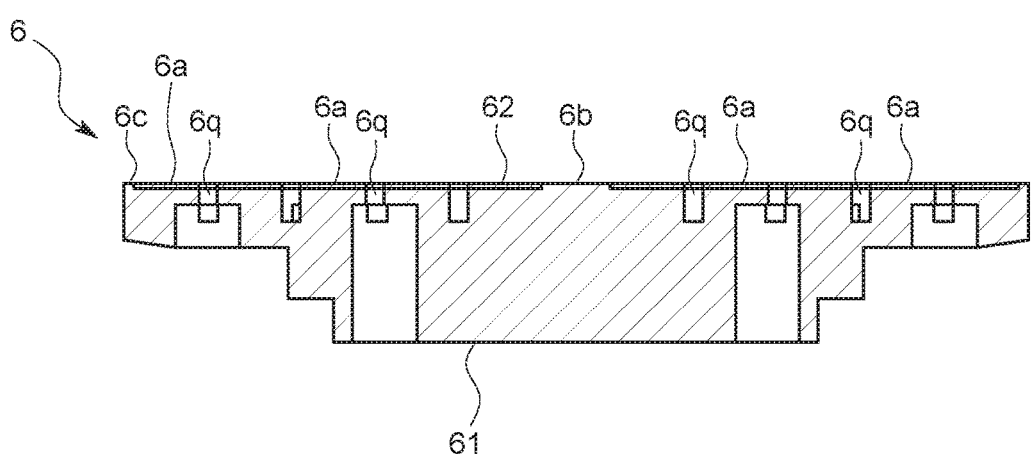
FIG. 9 is a vertical cross-sectional view of the valve body member in the alternative variation of the present invention.

Also, the crosslinked modified fluorine-based resin is covalently bonded to the metallic base body 61 at the time of the crosslinking, and directly stuck to the metallic base body 61, as shown in FIG. 5. As a result, the need for an underlying layer or adhesive such as a primer is eliminated, and therefore the problem of contamination due to the primer essentially never occurs.

Since a covalently bond has higher bonding force than a coordinate bond, an ionic bond, a bond from intermolecular forces, or the like, the crosslinked modified fluorine-based resin and the metallic base body 61 are stably bonded by its high bonding force.

Further, since the crosslinked modified fluorine-based resin has improved elasticity as compared with before the modification, the seating surface 6a can be separated from or contacted with the valve seat surface 4a without adhering to the valve seat surface 4a, and therefore the effect of improving the responsiveness of the fluid control valve 3 can also be expected.

Note that the present invention is not limited to the above-described embodiment.

The resin layer is not limited to the crosslinked modified fluorine-based resin but may be any of various resins such as polyester resins including polyamide, polycarbonate, polybutylene terephthalate (PBT), and the like, epoxy resins, and unsaturated polyester resins. In such a case, in order to eliminate the need for an adhesive, for example, a reactive functional group is formed by some means such as applying a specific chemical to the surface of the metallic base body, and the reactive functional group and the resin are chemically bonded to each other by heating or the like.

As the fluorine-based resin, one obtained by using one or by mixing two or more selected from tetrafluoroethylene copolymers, tetrafluoroethylene-perfluoro (alkyl vinyl ether) copolymers, tetrafluoroethylene-hexafluoropropylene copolymers, tetrafluoroethylene-ethylene copolymers, or polychlorotrifluoroethylene copolymers may be used.

Prior to applying the resin to the base body, the surface of the base body may be roughened by blasting to increase the surface area thereof so that the chemical bond between the resin layer and the base body can be more easily formed.

The chemical bond is not limited to the aforementioned covalent bond, but may include a coordinate bond, an ionic bond, a bond from intermolecular forces, or the like.

As illustrated in FIGS. 6 to 9, in order to make it possible to control a large flow rate with small strokes, in a fluid control valve 3 in which the surface of the base body 61 is formed with holes 6p or grooves 6q through which the fluid circulates, it is preferable to form the resin layer 62 so as to not be formed inside the holes 6p or the grooves 6q. This is because if the side surfaces of the holes 6p or the side and bottom surfaces of the grooves 6q are covered with the resin layer 62, the flow path cross-sectional areas of the holes or grooves are decreased, causing a disadvantage for the increase in flow rate. In addition, in FIGS. 5 to 8, a structure and member corresponding to those in the above-described embodiment are denoted by the same numerals.

Figure 10:
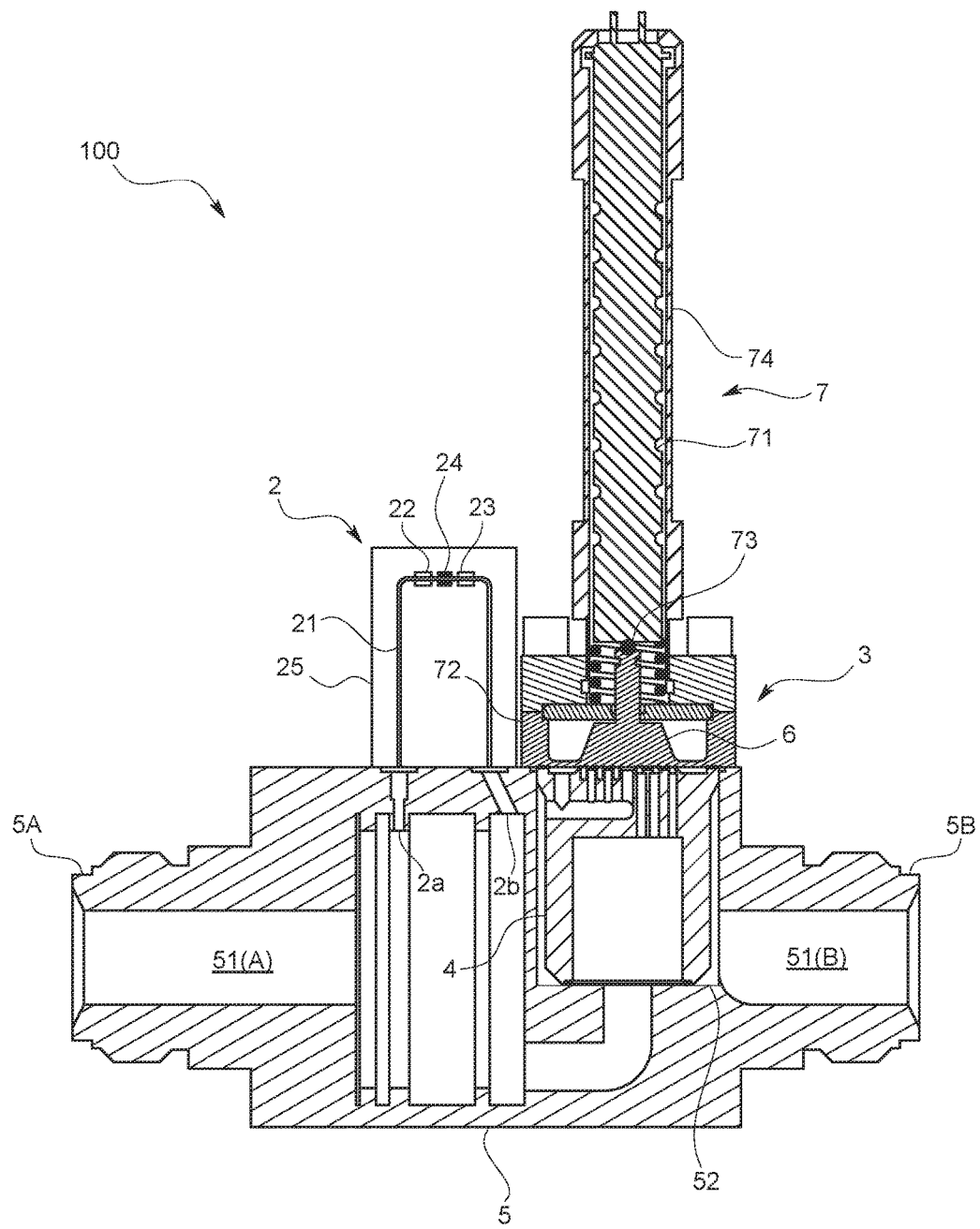
FIG. 10 is an overall longitudinal sectional view of a flow control device according to an alternative variation of the present invention.
Figure 11:
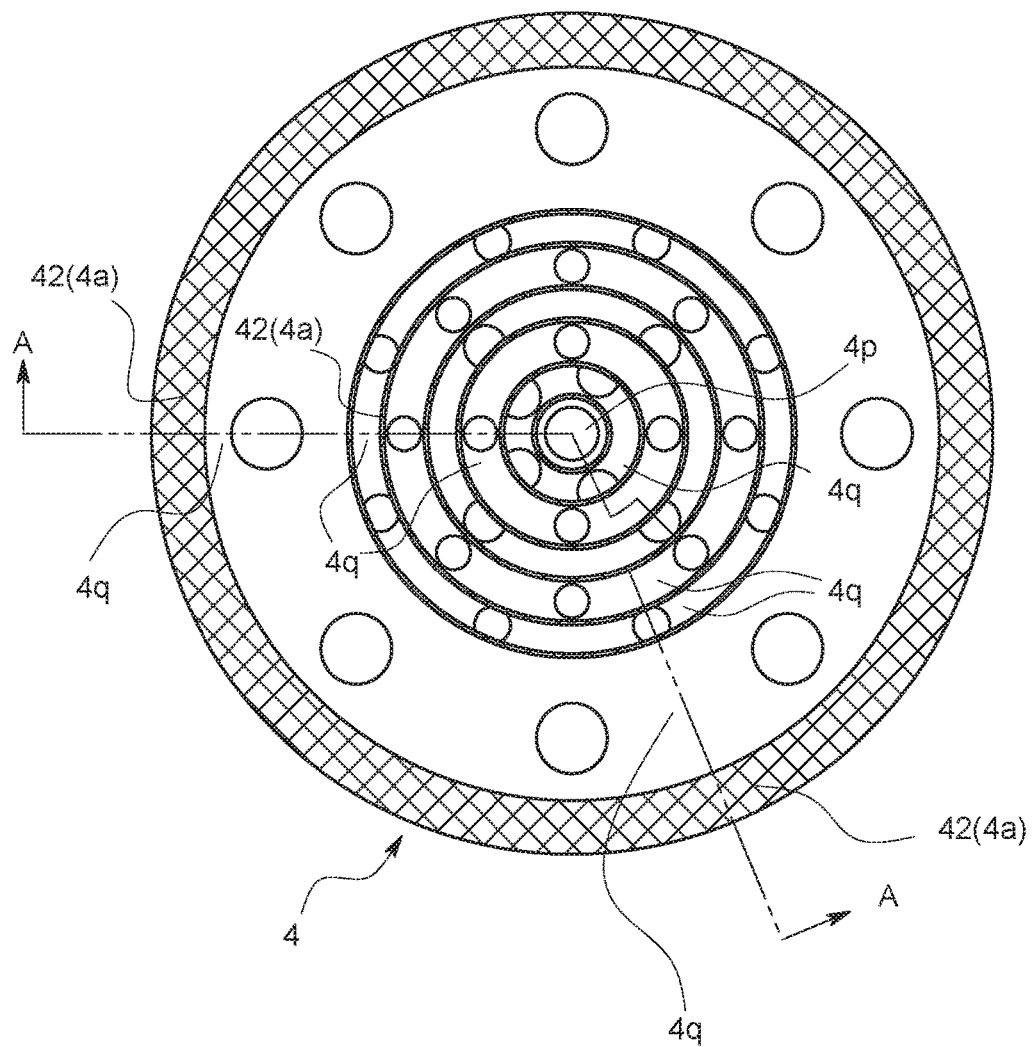
FIG. 11 is a plan view of a valve seat member according to the alternative variation.
Figure 12:
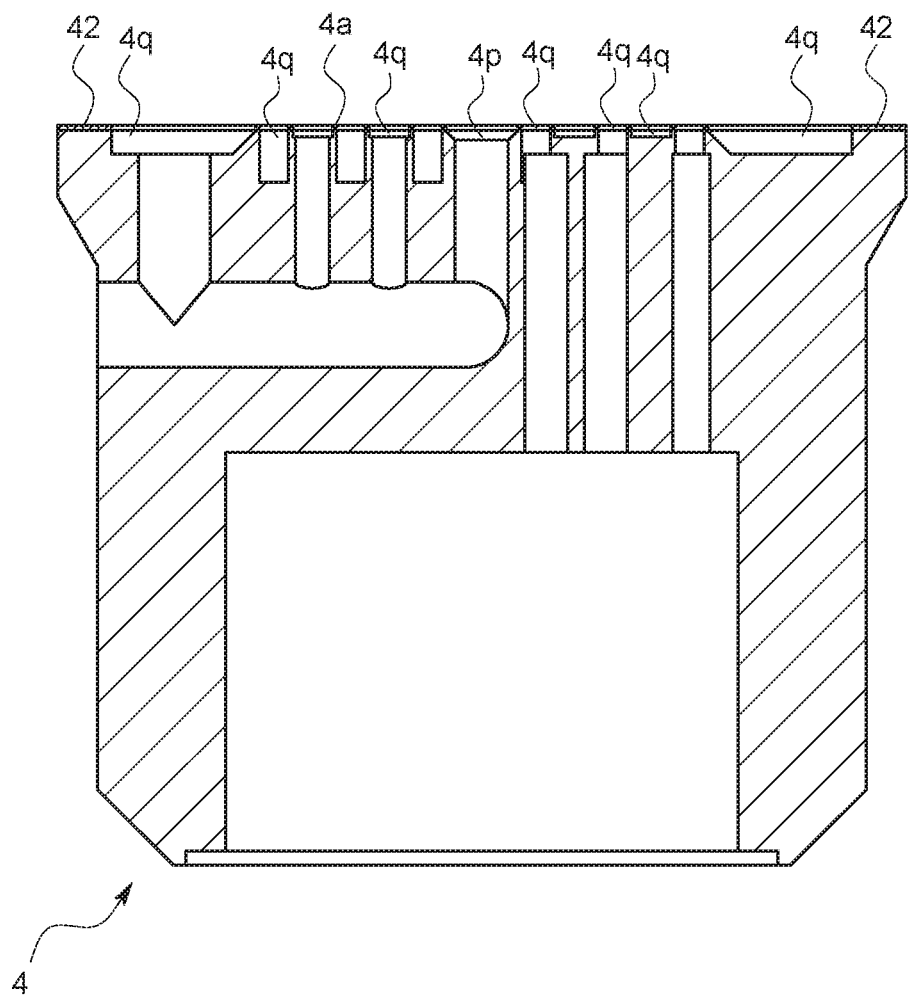
FIG. 12 is a cross-sectional view taken along a line A-A in FIG. 11.

In the above-described embodiment, the resin layer is provided only on the seating surface on the valve body member side; however, as shown in FIGS. 10-12, a resin layer 42 may be provided only on the valve seat surface 4a, or the resin layers may be provided on both of the surfaces. It is not necessary to cover the whole of one of the seating surface and the valve seat surface with the resin layer, and for example, an annular-shaped resin layer having a narrower width than the width of that surface may be formed.

In the above-described embodiment, the fluid control valve is of a normally-closed type; however, as shown in FIG. 10, for example, a fluid control valve of a normally-opened type may be applied with the present invention.

Figure 13:
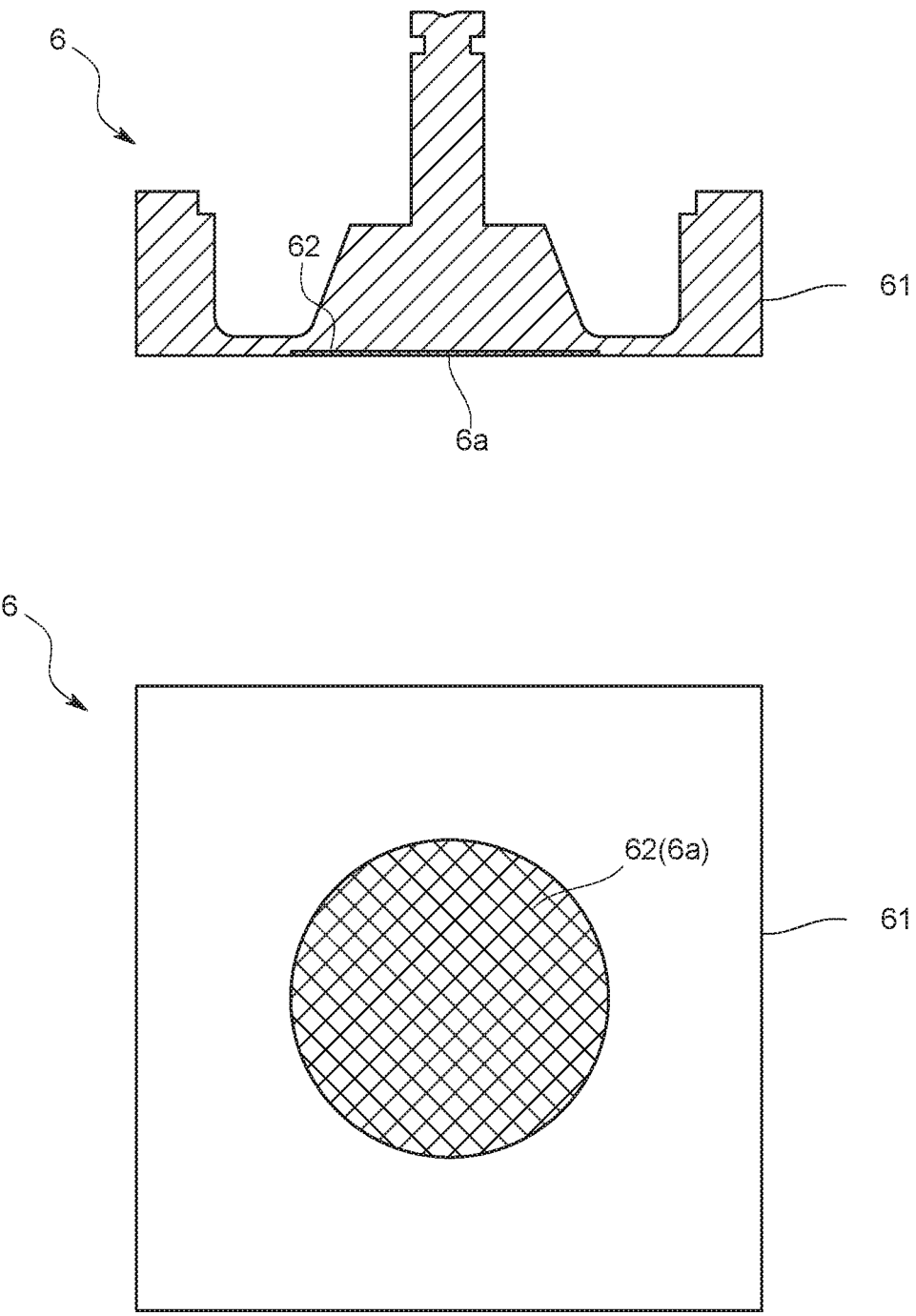
FIG. 13 is a cross-sectional view and a bottom view of the valve body member in an alternative variation of the present invention.

As an alternative variation of the normally-opened fluid control valve shown in FIG. 10, the resin layer 62 may be provided only on the seating surface 6a on the valve body member 6 as shown in FIG. 13.

As the fluid control valve, in addition to one of which the opening level can be arbitrarily set as in the above-described embodiment, the present invention can also be applied to an on-off valve that takes any of two values, "fully opened" or "fully closed". Also, as the actuator, without limitation to the piezoelectric type, an electromagnetic coil or the like may be used.

Further, in the above embodiment, the flow rate controller is described, but the present invention may be comprised, for example, a pressure controller.

Further, the shapes of the valve body member and valve seat member are not also limited to those in the above-described embodiment.

In FIGS. 6 to 9, the holes 6p and the grooves 6q through which the fluid flows are formed in the valve body member; however, as shown in FIGS. 10 to 12, holes 4p and grooves 4q through which the fluid flows may be formed on the surface of the base body of the valve seat member 4.

Furthermore, holes or grooves through which fluid flows can be formed in both of the valve seat member and the valve body member.

In FIGS. 6 to 12, the same reference numerals are assigned to components corresponding to those of the previous embodiment.

In addition, parts or all of the above-described embodiment and variations may be appropriately combined, and the present invention is not limited to any of the above-described embodiment and variations, but can be variously modified or combined without departing from the scope thereof.

LIST OF REFERENCE CHARACTERS

100: Flow rate controller
3: Fluid control valve
4: Valve seat member
6: Valve body member
6a: Seating surface
62: Resin layer
7: Actuator (driving mechanism)
6p: Hole
6q: Groove

The invention claimed is:

1. A fluid control valve comprising:
   a valve seat member formed with a valve seat surface; and
   a valve body member formed with a seating surface seated on the valve seat surface, and configured to control a flow of a fluid by separating or contacting the valve seat surface and the seating surface from or with each other, wherein
   at least one of the valve seat member and the valve body member comprises:
      a base body made of a metal material; and
      a single resin layer that covers a bottom surface of a concave portion of the base body,
   a front surface of the resin layer forms a part or a whole of the valve seat surface or the seating surface, and
   a rear surface of the resin layer is directly bonded to and forms a covalent bond with the metal material of the base body, and
   the resin layer is formed of a crosslinked modified fluorine-based resin.

2. The fluid control valve according to claim 1, wherein a top surface of the base body is formed with a groove or a hole through which the fluid circulates, and the resin layer is formed so as to not be formed inside the groove or the hole.

3. The fluid control valve according to claim 1, wherein the valve seat member or the valve body member is driven by a driving mechanism utilizing extension and contraction motions of a piezoelectric element, and the valve seat surface and the seating surface are thereby separated from or contacted with each other.

4. The fluid control valve according to claim 1, wherein the crosslinked modified fluorine-based resin is obtained by crosslinking and modifying a copolymer obtained by using one or by mixing two or more selected from a tetrafluoroethylene copolymer, a tetrafluoroethylene-perfluoro (alkyl vinyl ether) copolymer, a tetrafluoroethylene-hexafluoropropylene copolymer, a tetrafluoroethylene-ethylene copolymer, or a polychlorotrifluoroethylene copolymer.

5. A fluid control apparatus comprising the fluid control valve according to claim 1.

6. A fluid control valve comprising:
   a valve seat member formed with a valve seat surface on a surface thereof; and
   a valve body member formed, on a surface thereof, with a seating surface seated on the valve seat surface, and configured to control a flow of a fluid by separating or contacting the valve seat surface and the seating surface from or with each other, wherein
   at least one of the valve seat member and the valve body member comprises:
      a base body made of a metal material; and
      a single resin layer that covers a bottom surface of a concave portion of the base body,
   a front surface of the resin layer forms a part or a whole of the valve seat surface or the seating surface, and
   a rear surface of the resin layer is directly bonded to and forms a covalent bond with the metal material of the base body.

7. The fluid control valve according to claim 6, wherein a top surface of the base body is formed with a groove or a hole through which the fluid circulates, and the resin layer is formed so as to not be formed inside the groove or the hole.

8. The fluid control valve according to claim 6, wherein the valve seat member or the valve body member is driven by a driving mechanism utilizing extension and contraction motions of a piezoelectric element, and the valve seat surface and the seating surface are thereby separated from or contacted with each other.

9. A fluid control apparatus comprising the fluid control valve according to claim 6.

* * * * *